June 3, 1930.   P. ECKLEY   1,761,201
TRIFOCAL LENS
Original Filed May 6, 1925
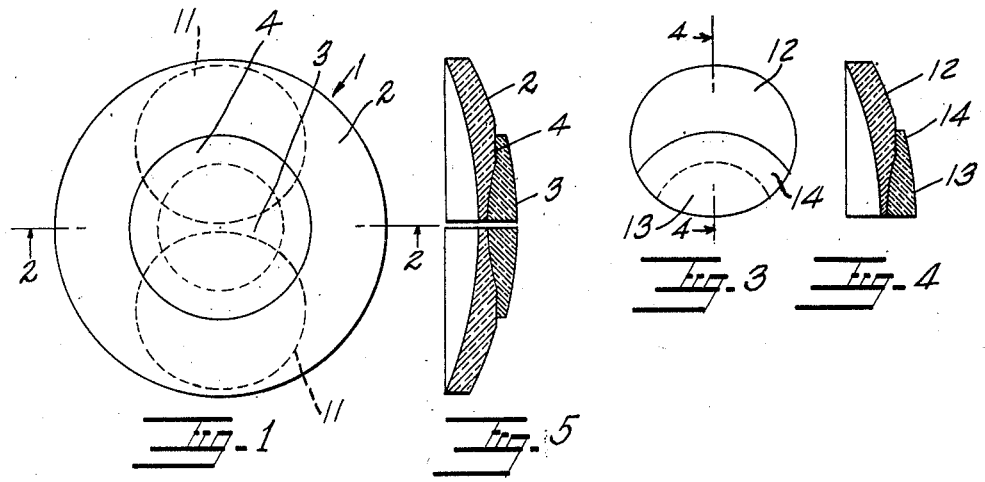
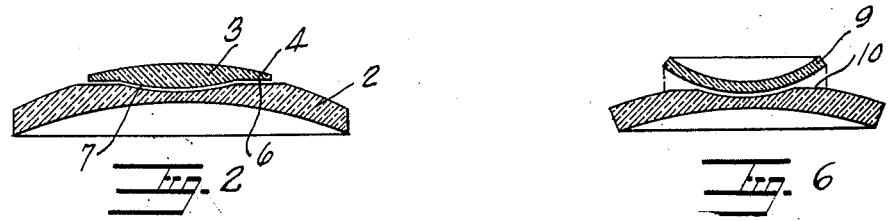
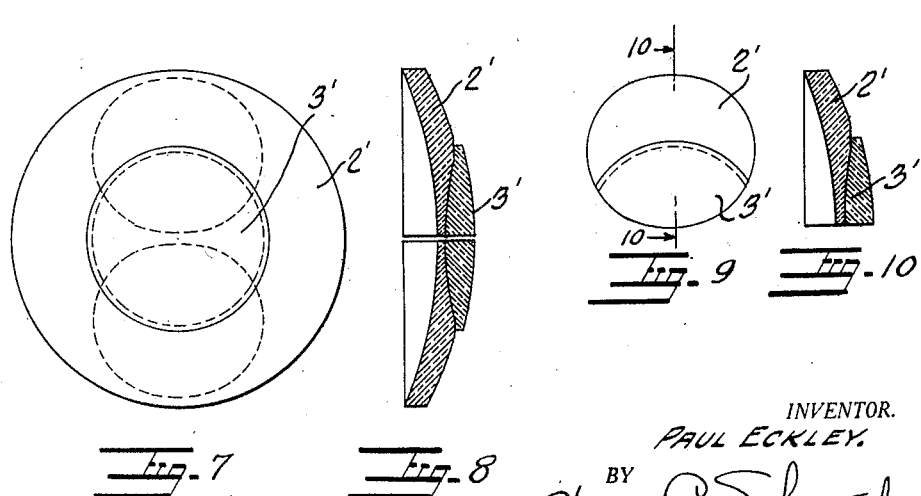
INVENTOR.
PAUL ECKLEY.
BY
Harry C. Schroeder
ATTORNEY Patented June 3, 1930

1,761,201

UNITED STATES PATENT OFFICE

PAUL ECKLEY, OF WALNUT CREEK, CALIFORNIA

TRIFOCAL LENS

Original application filed May 6, 1925, Serial No. 28,348. Divided and this application filed November 14, 1927. Serial No. 233,208.

This invention relates to improvements in lenses, and has particular reference to an improved construction of lens of the tri-focal or multi-focal type. The prime object of the present invention is to provide an improved construction of lens of the used type which embodies a plurality of foci to satisfactorily correct the vision of the wearer for near, intermediate, and distance vision.

A preferred embodiment of the invention is disclosed in the accompanying drawing, and the object of this embodiment is to provide a lens having three field—a distance field, an intermediate field, and a reading field, the intermediate field being constricted in width to about 1 mm. or less, so that its purpose is simply to act as a shock-absorbing medium to the eye to prevent sudden transition from the distance field to the stronger reading field.

A still further object of the invention is the provision of a lens consisting of ground sections fused together and arranged with respect to each other, whereby a lens may be further treated by a simple grinding and polishing operation and its manufacture quickly completed.

Still another object of the invention is the provision of a lens made up of a plurality of sections having different indices of refraction and dioptric curvatures, said sections being fused together and properly ground to provide fields of vision wherein the lines of joinder between the fields are of uniform thickness and without shoulders or projections which would ordinarily cause zones of spherical or chromatic aberrations.

A still further object of the invention is to provide a device which is strong and durable in its construction, inexpensive to manufacture, which is efficient in its operation and adequately performs the services desired of it.

A cross reference required by the law is hereby made to my co-pending application for a tri-focal optical lens, filed on May 6, 1925, and bearing the Serial No. 28,348, now Patent No. 1,654,641, patented January 3, 1928, this application being a divisional application of the same.

With the above numerated objects and many others in view, which will more readily appear as the nature of the invention is better understood, the same consists in the novel construction, combination, and arrangement of parts which will hereinafter be more fully described, illustrated, and claimed.

The essential features of the invention involved in the carrying out of the objects indicated are susceptible to modification, but a preferred embodiment of the invention is shown in the accompanying drawings in which:

Figure 1 is a view of one form of the blank used in the formation of my lens showing the different glasses fused together, from which glasses the tri-focal lenses are cut;

Figure 2 is a sectional view taken substantially along the line 2—2 of Figure 1, indicating the base glass and the inserted lens slightly separated to indicate certain features in the manner of manufacture;

Figure 3 is a view of one of the completed lenses formed from the blank shown in Figure 1;

Figure 4 is a sectional view taken substantially along the line 4—4 of Figure 3;

Figure 5 is a sectional view similar to Figure 2, showing the sections of the lens slightly separated to indicate the manner in which they are fused together;

Figure 6 is a section thru the fuse lenses to show a manner of manufacture in which the glass insert bends downwardly at its edges and fuse; and Figures 7, 8, 9, and 10 are views similar to Figures 1, 5, 3 and 4 respectively, but showing a slightly modified and preferred form of my invention.

Referring to the accompanying drawings, wherein similar reference characters designate similar parts thruout, the various figures described above adequately illustrate my invention, and the following detailed description is commensurate with the above mentioned drawings in enabling an artist to construct and assemble the constituent parts of the same.

In the above mentioned drawings, the reference numeral 1 indicates a blank from which the tri-focal lens is formed. This blank comprises a base lens 2 which is preferably formed of crown glass, and an insert lens 3, part of which is ground for one vision, but which has an outer annular rim 4, is suitable for an intermediate vision. This insert lens may be formed in any suitable manner and of any suitable material, yet it is preferable to form the same of flint glass, barium, or in fact any glass which has a high index of refraction, such as flint for example.

The insert lens 3 with the integral rim 4 is inserted on the preformed surfaces 6 and 7 in any of the well known manners, such as fusing. The insert may be fused in the manner shown in Figure 5. The outside edges 9 bend down and fuse into the surface 10 of the base member. Having formed a blank, as shown in Figure 1, this is preferably cut on one of its diameters, for instance the line 2—2. This forms two lens blanks as indicated by the dotted line 11 of Figure 1 which are cut and ground to form lenses as indicated in Figure 3. In this finished lens, the upper portion 12 of crown glass is used for distance vision, while the lower portion or sector 13 is used for the near or reading vision, and the partially annular section 14 forms the intermediate vision.

The manner of grinding the surface and of fusing the different types of glass are well known to those skilled in the trade and are not here described.

In Figures 7, 8, 9, and 10, I have shown a preferred embodiment of my invention. The base lens 2' of crown glass is preferably ground as above described. The central insert 3 of flint glass, barium glass, or the like is formed so that the annular ring is of very restricted width. The width is merely sufficient to provide a shock absorber to the eye when the focus on the retina is changed to accommodate the different local lengths of the lenses. The width of the rim on the insert is approximately 1 mm. but may be more or less as is desired. The intermediate vision is so narrow as to prevent the eye from seeing clearly thru the same, and it does not function to aid the eye in perceiving objects. As stated above, it merely is provided to prevent sudden transition from a lens of one focal length to a lens of another focal length.

The manner of cutting the blank and forming lenses from the same in a finished condition is the same as described above, and a reiteration of this description is not believed to be necessary. From the foregoing, it is thought that the construction, use, and many advantages of the herein described tri-focal lens will be apparent without further description.

I am aware that some changes may be made in the general arrangement and combination of the several parts, as well as in the details of construction thereof without departing from the scope of the present invention as set forth in the foregoing specification, and as defined in the following claims. Hence, I do not limit my invention to the exact arrangement and combination of the said devices and parts as described in the said specification, nor do I confine myself to the exact details of the construction of the said parts as illustrated in the accompanying drawing.

Having described my invention, what I claim and desire to secure by Letters Patent is:

1. The method of making a glass lens which comprises forming a depression in a base glass of a certain index of refraction, inserting a glass of another index of refraction in said depression, said insert having an annular junction surface for cooperation with an annular junction surface formed around the periphery of the depression in the base glass to provide an area of intermediate focal length between the base glass and the insert, permanently securing said glasses together and finally forming and shaping a finished lens.

2. The method of making a glass lens which comprises forming a depression in a base glass of a certain index of refraction, said depression having an annular junction surface therearound forming a second glass of another index of refraction so as to have a central portion of one focal length and a comparatively narrow annual, peripheral portion of another focal length, for cooperation with the annular junction surface of the base glass inserting said central portion in said depression, fusing said glasses together and finally forming and completing a lens whereby the same will have areas of three different and distinct focal legths thru the base glass, the insert, and periphery of the insert.

3. The method of making a lens which comprises forming in a base glass a depression of a known curvature, forming on the periphery of this depression a narrow annular ring of a different curvature, placing an insert therein, said insert having a central portion to conform to the depression, and a narrow annular rim to conform to the annular ring in the base glass, and fusing said base glass and insert together.

4. The method of making a tri-focal lens which comprises forming in a circular base glass a depression of a known curvature, forming on the periphery of this depression a narrow annular ring of a different curvature, placing an insert having a higher index of refraction in said depression, and fusing said insert and base glass together, said insert having a narrow annular rim around its periphery for forming an area of intermediate focal length between the base glass and the insert.

5. The method of making a tri-focal lens which comprises forming in a base glass a depression of a known curvature, an insert forming on the periphery of this depression an annular ring of a different curvature forming on said insert an annular rim which has a curvature to conform to the annular ring on the base glass, placing said insert in said depression, fusing said insert to said base glass, cutting said base glass and fused insert transversely, and cutting and grinding each section to form a complete lens.

6. The method of making a tri-focal lens which comprises forming in a base glass a depression of a known curvature, forming on the periphery of this depression an annular ring of a different curvature, forming an insert having a central portion, which has a curvature to match the curvature of said depression, forming on said insert an annular rim which has a curvature to conform to the annular ring on the base glass, placing said insert in said depression, fusing said insert to said base glass, cutting said base glass and fused insert transversely on the diameter thereof, and cutting and grinding each half section to form a complete lens.

In testimony whereof I affix my signature.

PAUL ECKLEY.